(12) United States Patent
Yang et al.

(10) Patent No.: US 12,472,577 B2
(45) Date of Patent: Nov. 18, 2025

(54) LATERAL ELECTRO-CONDUCTION DEVICE AND METHOD FOR MULTI-WIRE SUBMERGED ARC INNER/OUTER WELDING OF STRAIGHT-SEAM STEEL PIPE

(71) Applicant: Harbin Welding Institute Limited Company, Heilongjiang (CN)

(72) Inventors: Zhanli Yang, Heilongjiang (CN); Dong Du, Heilongjiang (CN); Shanbao Zhang, Heilongjiang (CN); Kai Xu, Heilongjiang (CN); Bing Du, Heilongjiang (CN); Yajun Wu, Heilongjiang (CN); Qilong Tang, Heilongjiang (CN); Zhongwang Gong, Heilongjiang (CN); Debin Bai, Heilongjiang (CN); Zekun Yang, Heilongjiang (CN); Xiucheng Xiao, Heilongjiang (CN); Dakui Fei, Heilongjiang (CN); Guangnan Zhao, Heilongjiang (CN); Wei Li, Heilongjiang (CN); Yongbo Yang, Heilongjiang (CN)

(73) Assignee: Harbin Welding Institute Limited Company, Harbin (CN)

( * ) Notice: Subject to any disclaimer, the term of this patent is extended or adjusted under 35 U.S.C. 154(b) by 53 days.

(21) Appl. No.: 18/412,885

(22) Filed: Jan. 15, 2024

(65) Prior Publication Data
US 2024/0207965 A1    Jun. 27, 2024

Related U.S. Application Data

(63) Continuation of application No. PCT/CN2023/084111, filed on Mar. 27, 2023.

(30) Foreign Application Priority Data

Dec. 27, 2022   (CN) .......................... 202211690127.1

(51) Int. Cl.
*B23K 9/10*    (2006.01)
*B23K 9/025*   (2006.01)
(Continued)

(52) U.S. Cl.
CPC ............ *B23K 9/105* (2013.01); *B23K 9/0253* (2013.01); *B23K 9/18* (2013.01); *B23K 2101/06* (2018.08); *B23K 2103/04* (2018.08)

(58) Field of Classification Search
CPC ............ B23K 2101/06; B23K 2103/04; B23K 37/0229; B23K 37/0533; B23K 9/0253; B23K 9/105; B23K 9/18; B23K 9/188
(Continued)

(56) References Cited

U.S. PATENT DOCUMENTS

| 4,341,938 A | 7/1982 | Matsubara et al. |
| 5,938,954 A * | 8/1999 | Onuma .............. B23K 26/1224 219/121.75 |

(Continued)

FOREIGN PATENT DOCUMENTS

| CN | 101804503 A | 8/2010 |
| CN | 203725959 U | 7/2014 |

(Continued)

*Primary Examiner* — Chris Q Liu
*Assistant Examiner* — James F Sims, III (57) ABSTRACT

The present disclosure relates to electro-conduction devices and methods for submerged arc welding of straight-seam steel pipes and in particular to a lateral electro-conduction device and method for multi-wire submerged arc inner/outer welding of a straight-seam steel pipe. The present disclosure aims to overcome the problem of poor closing of the electromagnetic field resulting from the existing negative-pole electro-conduction mechanism and the problem of unstable welding process resulting from bending deformation in the steel pipe welding process. The device includes: a floating surface contact electro-conduction device, capable of forming a surface contact with an outer surface of the straight-seam steel pipe; a lateral electro-conduction brush device, including multiple electro-conduction brushes and electrically connected with the floating surface contact electro-conduction device; a lateral electro-conduction metal plate. electrically connected with a negative-pole wire harness of a welding machine and electrically connected with the lateral electro-conduction brush device.

7 Claims, 5 Drawing Sheets

(51) Int. Cl.
  *B23K 9/18* (2006.01)
  *B23K 101/06* (2006.01)
  *B23K 103/04* (2006.01)
(58) Field of Classification Search
  USPC .................................................. 219/121.46
  See application file for complete search history.

(56) References Cited

U.S. PATENT DOCUMENTS 6,127,644 A * 10/2000 Singh ..................... B23K 9/048
  219/76.1
2008/0272101 A1   11/2008 Oh et al.

FOREIGN PATENT DOCUMENTS

CN    204011757 U   12/2014
CN    217551403 U   10/2022

* cited by examiner

LATERAL ELECTRO-CONDUCTION DEVICE AND METHOD FOR MULTI-WIRE SUBMERGED ARC INNER/OUTER WELDING OF STRAIGHT-SEAM STEEL PIPE

CROSS-REFERENCE TO RELATED APPLICATIONS

This application is a bypass continuation application of PCT application no.: PCT/CN2023/084111. This application claims priorities from PCT Application PCT/CN2023/084111, filed Mar. 27, 2023, and from Chinese patent application 202211690127.1, Dec. 27, 2022, the contents of which are incorporated herein in the entirety by reference.

TECHNICAL FIELD

The present disclosure relates to an electro-conduction device and method for submerged arc welding of a straight-seam steel pipe.

BACKGROUND

Straight-seam steel pipes are a major type of pipes in the current pipeline applications due to their advantages of a smaller amount of welding work, less welding defects and higher applicability to production of thick-walled steel pipes, and the like. The straight-seam inner welding and straight-seam outer welding are core processes to ensure the welding quality of the straight-seam steel pipes. Its welding seam is a final service welding seam of the products and thus the welding quality has a direct impact on the safety and reliability of the pipeline service.

In the inner and outer welding field of straight-seam steel pipes, an existing negative-pole electro-conduction mechanism is a pneumatic lift electro-conduction brush device externally provided with a cross working machine with lift function. The negative pole of the power source is wired to an electro-conduction plate of the electro-conduction brush frame and thus a circuit is formed by the electro-conduction brush in contact with the pipe body. However, the above manner has the following two problems.

Firstly, in the existing electro-conduction mechanism, two groups of electro-conduction brushes are spaced by a distance; in the welding process, there is only one group of electro-conduction brush in contact with the steep pipe at each of a start welding end and an arc quenching welding end of the steel pipes. In this case, it is possible to bring a problem to the closing of the electromagnetic field, affecting the welding quality of pipe ends of the steel pipes.

Secondly, when welding is performed on small-diameter steel pipes, the steel pipes may suffer axial bending deformation due to welding stress in the welding process, such that a torque is generated at the support points of the two groups of electro-conduction brushes in contact with the small-diameter steel pipes and may even cause the entire machine frame to shake, affecting the stable progress of the welding process.

SUMMARY

In order to overcome the problem of poor closing of the electromagnetic field resulting from the existing negative-pole electro-conduction mechanism and the problem of unstable welding process resulting from bending deformation in the steel pipe welding process, the present disclosure provides a lateral electro-conduction device and method for multi-wire submerged arc inner/outer welding of a straight-seam steel pipe.

The present disclosure provides a lateral electro-conduction device for multi-wire submerged arc inner/outer welding of a straight-seam steel pipe. The device includes a support device, a floating surface contact electro-conduction device, a lateral electro-conduction brush device and a lateral electro-conduction metal plate.

The support device is used to support a straight-seam steel pipe.

The floating surface contact electro-conduction device forms a surface contact with an outer surface of the straight-seam steel pipe and is electrically connected with the straight-seam steel pipe.

The lateral electro-conduction brush device is located at a side of the support device, and the lateral electro-conduction brush device includes multiple electro-conduction brushes and is electrically connected with the floating surface contact electro-conduction device.

The lateral electro-conduction metal plate is located at a side of the lateral electro-conduction brush device and is electrically connected with a negative-pole wire harness of a welding machine.

The electro-conduction brushes of the lateral electro-conduction brush device are electrically connected with the lateral electro-conduction metal plate; in this way, an electro-conduction circuit is formed by the negative-pole wire harness, the lateral electro-conduction metal plate, the lateral electro-conduction brush device, the floating surface contact electro-conduction device, the straight-seam steel pipe and a welding wire electrode for performing multi-wire submerged arc inner/outer welding on the straight-seam steel pipe.

The present disclosure further provides a lateral electro-conduction method for multi-wire submerged arc inner/outer welding of a straight-seam steel pipe. Based on the lateral electro-conduction device, the following specific steps are performed:

At step 1, by using the steel pipe detection device, whether the straight-seam steel pipe is present on the support device is detected; if the straight-seam steel pipe is present, step 2 is performed and otherwise, a standby state is maintained.

At step 2, the floating surface contact electro-conduction device is lifted such that the electro-conduction floating blocks form a surface contact with an outer sidewall of the straight-seam steel pipe.

At step 3, the electro-conduction brushes of the lateral electro-conduction brush device extend to be in contact with the lateral electro-conduction metal plate.

The present disclosure has the following beneficial effects.

In the present disclosure, with a novel electro-conduction structure and method, the electromagnetic field is always in a good and stable closed state during a welding process, stabilizing the multi-arc welding process and improving the welding quality. Furthermore, when welding is performed on a small-diameter steel pipe, the original electro-conduction brush frame structure is removed, and the sources of generating shakes and running resistances are eliminated, helping achieve persistent stability of the welding process.

DETAILED DESCRIPTIONS OF EMBODIMENTS

The technical solutions of the embodiments of the present disclosure will be fully and clearly described below in combination with the drawings in the embodiments of the present disclosure. Apparently, the embodiments described herein are only some embodiments of the present disclosure rather than all embodiments. All other embodiments obtained by those skilled in the arts based on these embodiments of the present disclosure without carrying out creative work shall all fall within the scope of protection of the present disclosure.

It is noted that in a case of no conflicts, the embodiments and the features in the embodiments of the present disclosure may be mutually combined.

The present disclosure will be further described below in combination with drawings and specific embodiments but these descriptions are not used as limiting of the present disclosure.

Specific Embodiment 1

Figure 1:
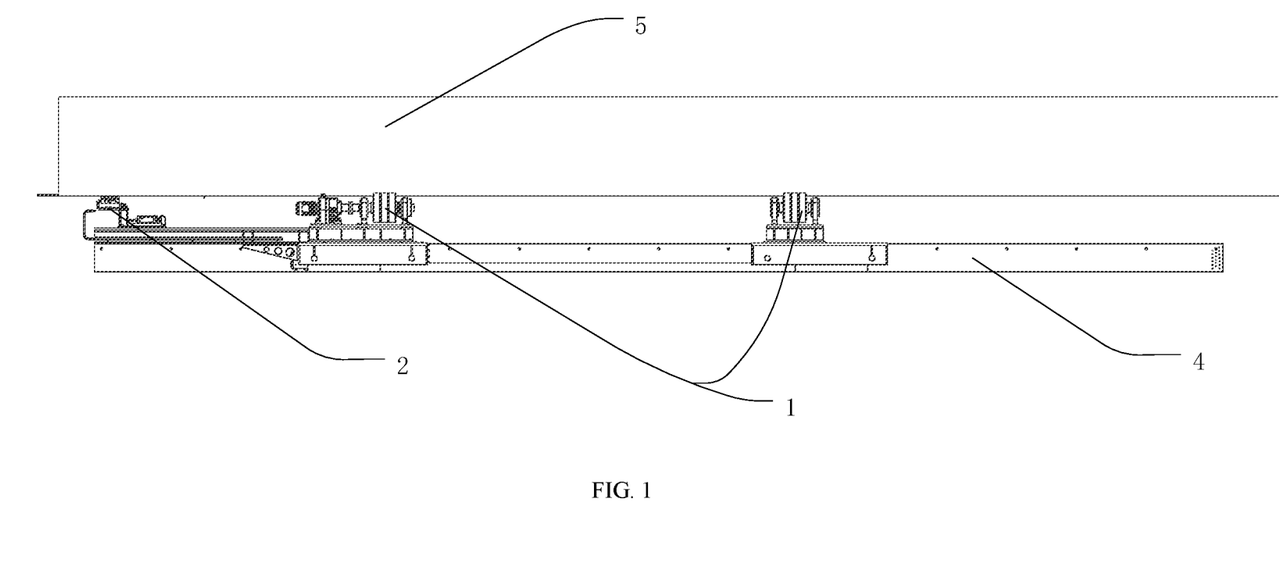
FIG. 1 is a schematic diagram of side-view mating structure of a lateral electro-conduction device for multi-wire submerged arc inner/outer welding of a straight-seam steel pipe and a straight-seam steel pipe according to an embodiment of the present disclosure.
Figure 2:
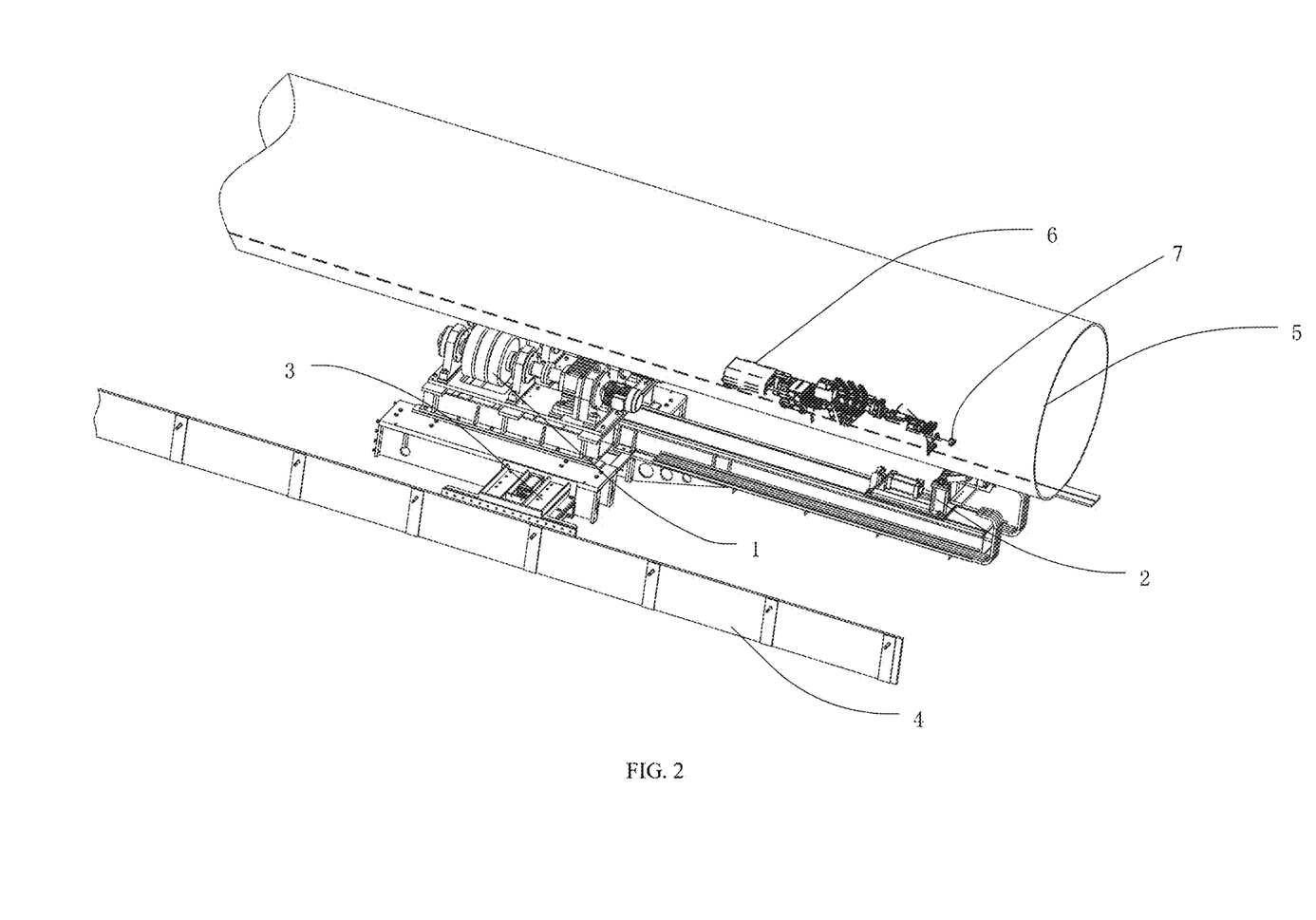
FIG. 2 is a schematic diagram of mating structure of a lateral electro-conduction device for multi-wire submerged arc inner/outer welding of a straight-seam steel pipe, a straight-seam steel pipe and a welding machine according to an embodiment of the present disclosure.

In this embodiment, there is provided a lateral electro-conduction device for multi-wire submerged arc inner/outer welding of a straight-seam steel pipe. As shown in FIGS. 1 to 2, the device includes a support device 1, a floating surface contact electro-conduction device 2, a lateral electro-conduction brush device 3 and a lateral electro-conduction metal plate 4.

The support device 1 is used to support a straight-seam steel pipe 5.

The floating surface contact electro-conduction device 2 forms a surface contact with an outer surface of the straight-seam steel pipe 5 and is electrically connected with the straight-seam steel pipe 5.

The lateral electro-conduction brush device 3 is located at a side of the support device 1. The lateral electro-conduction brush device 3 includes multiple electro-conduction brushes 3-1 and is electrically connected with the floating surface contact electro-conduction device 2.

The lateral electro-conduction metal plate 4 is located at a side of the lateral electro-conduction brush device 3 and is electrically connected with a negative-pole wire harness of a welding machine 6.

The electro-conduction brushes 3-1 of the lateral electro-conduction brush device 3 can move to a surface of the lateral electro-conduction metal plate 4 and is electrically connected with the lateral electro-conduction metal plate 4. In this way, an electro-conduction circuit is formed by the negative-pole wire harness, the lateral electro-conduction metal plate 4, the lateral electro-conduction brush device 3, the floating surface contact electro-conduction device 2, the straight-seam steel pipe 5 and a welding wire electrode for performing multi-wire submerged arc inner/outer welding on the straight-seam steel pipe.

Specific Embodiment 2

Figure 3:
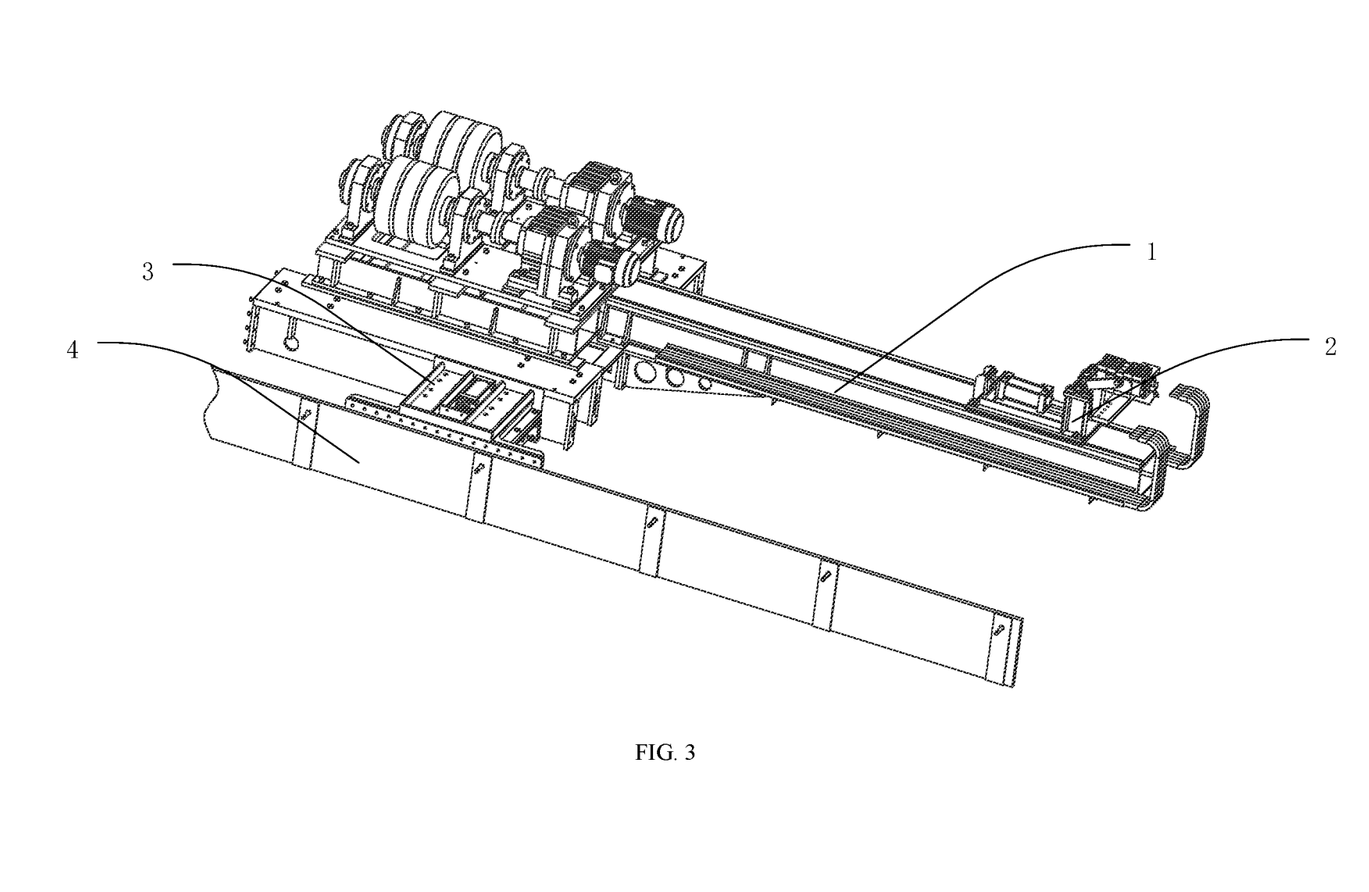
FIG. 3 is a structural schematic diagram of a lateral electro-conduction device for multi-wire submerged arc inner/outer welding of a straight-seam steel pipe according to an embodiment of the present disclosure.
Figure 4:
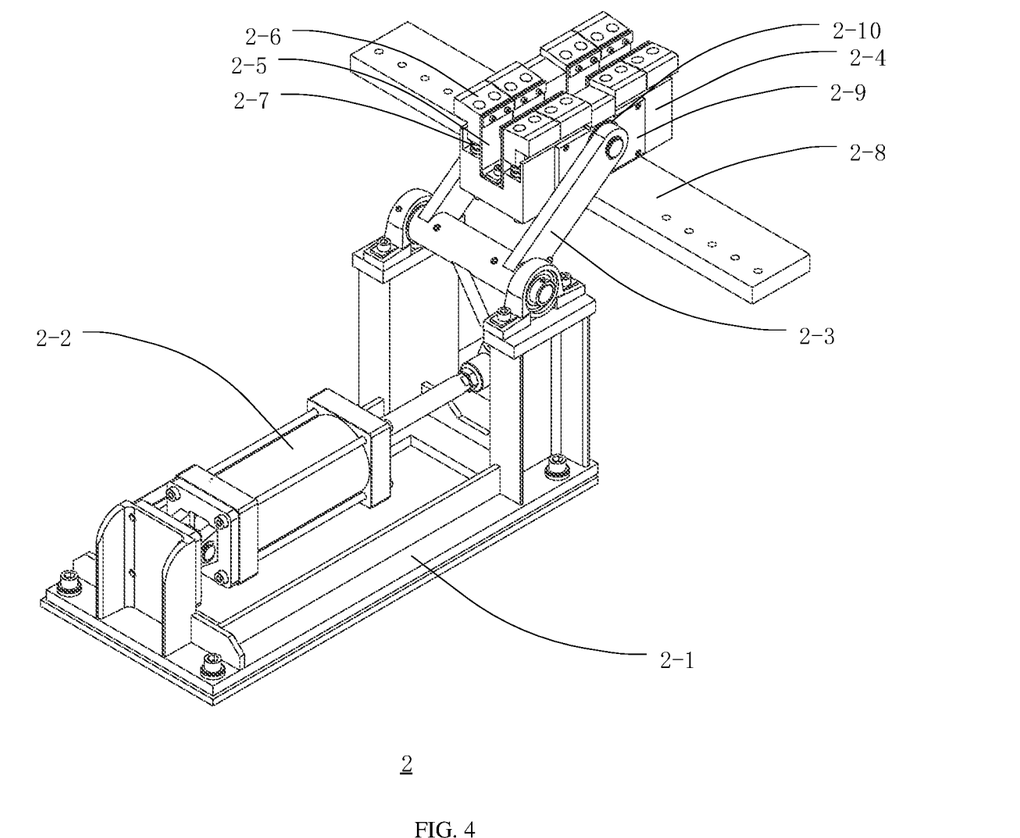
FIG. 4 is a structural schematic diagram of a floating surface contact electro-conduction device in a lateral electro-conduction device for multi-wire submerged arc inner/outer welding of a straight-seam steel pipe according to an embodiment of the present disclosure.

This embodiment further describes the embodiment 1. In this embodiment, as shown in FIGS. 3 to 4, the floating surface contact electro-conduction device 2 includes a base 2-1, a floating device cylinder 2-2, a floating device connection rod 2-3, a fixed electro-conduction seat 2-4, an electro-conduction wire 2-5, multiple electro-conduction floating blocks 2-6, and multiple springs 2-7.

The base 2-1 is fixed at an end of the support device 1 and insulated from the support device 1.

The floating device cylinder 2-2 is fixed on the base 2-1.

The floating device connection rod 2-3 has an L-shaped section. At one side of an L-shape folding point it is one push plate, and at the other side there are two support rods; and the two support rods are disposed in parallel and one end of the two support rods is fixed to an end of the push plate.

The floating device connection rod 2-3 is hinged to the base 2-1 at the folding point.

The other end of the push plate is hinged to a power output shaft of the floating device cylinder 2-2.

The fixed electro-conduction seat 2-4 is located between two support rods and the other end of the two support rods is hinged to two outer sidewalls of the fixed electro-conduction seat 2-4 respectively. Thus, when the power output shaft of the floating device cylinder 2-2 pushes the floating device connection rod 2-3, the floating device connection rod 2-3 lifts the fixed electro-conduction seat 2-4.

A groove is disposed on the fixed electro-conduction seat 2-4 and multiple pairs of electro-conduction floating blocks 2-6 are symmetrically inserted into the groove of the fixed electro-conduction seat 2-4. All the electro-conduction floating blocks 2-6 are fixedly and electrically connected to the fixed electro-conduction seat 2-4 via the electro-conduction wire 2-5. A spring 2-7 is fixed between the bottom of each electro-conduction floating block 2-6 and the groove of the fixed electro-conduction seat 2-4.

Specific Embodiment 3

This embodiment further describes the embodiment 2. In this embodiment, the floating surface contact electro-conduction device 2 further includes a steel pipe detection device 7.

The steel pipe detection device 7 is used to send a floating device start signal when detecting that a steel pipe is present on the support device 1.

The floating device cylinder 2-2 is used to, after receiving the floating device start signal, extend the power output shaft to push the floating device connection rod 2-3.

Specific Embodiment 4

This embodiment further describes the embodiment 1, 2 or 3. As shown in FIG. 3, in this embodiment, the floating surface contact electro-conduction device 2 further includes at least one negative-pole welding wire harness connection plate 2-8.

The negative-pole welding wire harness connection plate 2-8 is fixed on a sidewall of the fixed electro-connection seat 2-4.

The negative-pole welding wire harness connection plate 2-8 is electrically connected with the electro-connection floating blocks 2-6 by the fixed electro-conduction seat 2-4.

The lateral electro-conduction brush device 3 is electrically connected to the negative-pole welding wire harness connection plate 2-8 by a wire.

Specific Embodiment 5

Figure 5:
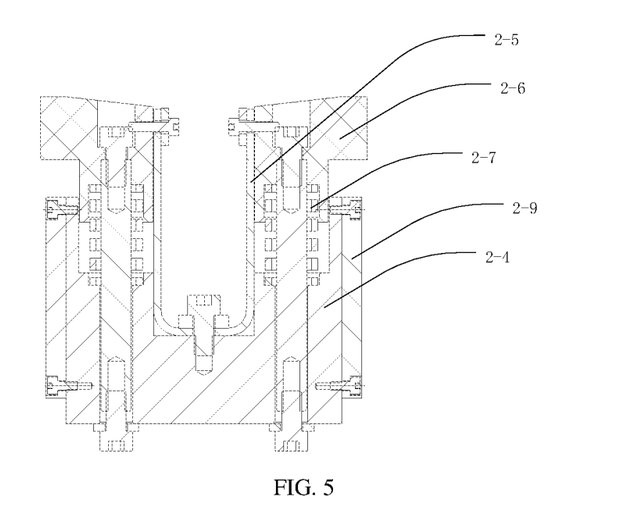
FIG. 5 is a structural front side view of a floating surface contact electro-conduction device in a lateral electro-conduction device for multi-wire submerged arc inner/outer welding of a straight-seam steel pipe according to an embodiment of the present disclosure.
Figure 6:
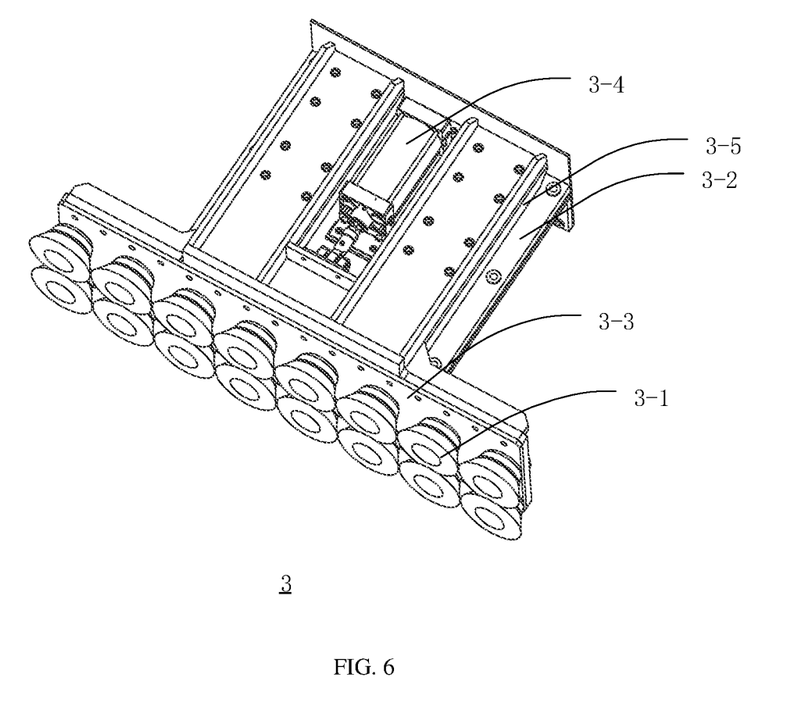
FIG. 6 is a structural schematic diagram of a lateral electro-conduction brush device in lateral electro-conduction device for multi-wire submerged arc inner/outer welding of a straight-seam steel pipe according to an embodiment of the present disclosure.

This embodiment further describes the embodiment 4. As shown in FIG. 5, in this embodiment, the lateral electro-conduction brush device 3 further includes an electric brush seat 3-2, an electric brush electro-conduction plate 3-3, an electric brush cylinder 3-4 and a slide guide rail 3-5.

The electric brush seat 3-2 is fixed at a side surface of the support device 1.

The electric brush electro-conduction plate 3-3 is slidably connected with the electric brush seat 3-2 by the slide guide rail 3-5.

A cylinder body of the electric brush cylinder 3-4 is fixed on the electric brush seat 3-2, and a power output shaft of the electric brush cylinder 3-4 is fixed to the electric brush electro-conduction plate 3-3 to push the electric brush electro-conduction plate 3-3 to slide relative to the electric brush seat 3-2.

Multiple electro-conduction brushes 3-1 are fixed on an outer sidewall of the electric brush electro-conduction plate 3-3; the multiple electro-conduction brushes 3-1 are electrically connected to the negative-pole welding wire harness connection plate 2-8 by the electric brush electro-conduction plate 3-3 and a wire.

Specific Embodiment 6

This embodiment further describes the embodiment 5. In this embodiment, based on the above lateral electro-conduction device, the following specific steps are performed:

At step 1, by using the steel pipe detection device 7, whether the straight-seam steel pipe 5 is present on the support device 1 is detected. If the straight-seam steel pipe 5 is present, step 2 is performed and otherwise, a standby state is maintained.

At step 2, the floating surface contact electro-conduction device 2 is lifted such that the electro-conduction floating blocks 2-6 form a surface contact with an outer sidewall of the straight-seam steel pipe 5.

At step 3, the electro-conduction brushes 3-1 of the lateral electro-conduction brush device 3 extend to be in contact with the lateral electro-conduction metal plate 4.

An electro-conduction circuit is formed when the negative-pole wire harness, the lateral electro-conduction metal plate 4, the lateral electro-conduction brush device 3, the floating surface contact electro-conduction device 2, the straight-seam steel pipe 5 and the welding wire electrode are energized.

EMBODIMENT

As shown in FIG. 1, the welding machine 6 is located inside the straight-seam steel pipe 5 when working. A welding wire electrode connected with a positive pole of the welding machine 6 is arranged in advance in the welding seam before welding is performed on the straight-seam steel pipe 5.

As shown in FIGS. 1 to 2, in the present disclosure, a welding negative-pole wire harness of the welding machine 6 is connected to the entire lateral electro-conduction metal plate 4 (steel plate may be selected) and the lateral electro-conduction metal plate 4 placed beside a countertop next to a track fixed on the support device 1 (usually welding car); the support device 1 is taken as an electro-conduction carrier, and at a side surface of the support device 1 is the lateral electro-conduction brush device 3 with the electric brush cylinder 3-4 (the lateral electro-conduction brush device 3 is to be insulated from the support device 1). In a welding process, the electro-conduction brushes 3-1 in the lateral electro-conduction brush device 3 extend to be in contact with the lateral electro-conduction metal plate 4.

The floating surface contact electro-conduction device 2 with the steel pipe detection device 7 is provided at a front end of the support device 1 (the floating surface contact electro-conduction device 2 can move along a length direction of the steel pipes to adapt to the steel pipes of different lengths). When the steel pipe detection device 7 detects a straight-seam steel pipe 5 is present, the floating surface contact electro-conduction device 2 is lifted under the push of the floating device cylinder 2-2 (the floating device connection rod 2-3 is insulated from the fixed electro-conduction seat 2-4 by an insulation plate 2-9 and an insulation shaft sleeve 2-10) and thus the electro-conduction floating blocks 2-6 form a surface contact with the pipe body of the straight-seam steel pipe 5. When welding arcing is performed, a complete circuit is formed by the negative-pole wire harness, the lateral electro-conduction metal plate 4, the lateral electro-conduction brush device 3, the floating surface contact electro-conduction device 2 and the welding wire electrode, ensuring smooth arcing of the welding wire.

In the present disclosure, since a larger surface contact is formed between the electro-conduction device and the pipe body of the straight-seam steel pipe 5 (a surface contact is formed between the floating surface contact electro-conduction device and the straight-seam steel pipe 5) and a smaller contact surface is formed between the lateral electro-conduction device 3 and the outer lateral electro-conduction metal plate 4, even if the steel wire of the electro-conduction brushes 3-1 of the lateral electro-conduction device 3 strikes arc on the lateral electro-conduction metal plate 4, no damage will be brought to the straight-seam steel pipe 5.

Although the present disclosure is described by referring specific embodiments herein, it should be understood that these embodiments are merely examples of the principle and applications of the present disclosure. Therefore, it should be understood that many modifications may be made to the exemplary embodiments and other arrangements may be designed as long as such modifications and arrangements do not depart from the spirit and scope of the claims of the present disclosure. It should be understood that the manners described in different original claims may be combined with different dependent claims and the features described herein.

It is further understood that the features described in combination with a single embodiment may be used in other embodiments.

What is claimed is:

1. A lateral electro-conduction device for multi-wire submerged arc inner/outer welding of a straight-seam steel pipe, comprising:
   a support device (1);
   a floating surface contact electro-conduction device (2);
   a lateral electro-conduction brush device (3); and
   a lateral electro-conduction metal plate (4); wherein
   the support device (1) is used to support a straight-seam steel pipe (5);
   the floating surface contact electro-conduction device (2) forms a surface contact with an outer surface of the straight-seam steel pipe (5) and is electrically connected with the straight-seam steel pipe (5);
   the lateral electro-conduction brush device (3) is located at a side of the support device (1), and the lateral electro-conduction brush device (3) comprises multiple electro-conduction brushes (3-1) and is electrically connected with the floating surface contact electro-conduction device (2);
   the lateral electro-conduction metal plate (4) is located at a side of the lateral electro-conduction brush device (3) and is electrically connected with a negative-pole wire harness of a welding machine (6); and
   the electro-conduction brushes (3-1) of the lateral electro-conduction brush device (3) are electrically connected with the lateral electro-conduction metal plate (4); in this way, an electro-conduction circuit is formed by the negative-pole wire harness, the lateral electro-conduction metal plate (4), the lateral electro-conduction brush device (3), the floating surface contact electro-conduction device (2), the straight-seam steel pipe (5) and a welding wire electrode for performing multi-wire submerged arc inner/outer welding on the straight-seam steel pipe (5, wherein the welding wire electrode connected with a positive pole of the welding machine (6) is arranged in advance in the welding seam before welding is performed on the straight-seam steel pipe (5).

2. The lateral electro-conduction device of claim 1, wherein the floating surface contact electro-conduction device (2) comprises a base (2-1), a floating device cylinder (2-2), a floating device connection rod (2-3), a fixed electro-conduction seat (2-4), an electro-conduction wire (2-5), multiple electro-conduction floating blocks (2-6), and multiple springs (2-7);
   the base (2-1) is fixed at an end of the support device (1) and insulated from the support device (1);
   the floating device cylinder (2-2) is fixed on the base (2-1);
   the floating device connection rod (2-3) has an L-shaped section having a folding point; at one side of the folding point is one push plate, and at the other side of the folding point are two support rods; the two support rods are disposed in parallel and one end of the two support rods is fixed to an end of the push plate;
   the floating device connection rod (2-3) is hinged to the base (2-1) at the folding point;
   the other end of the push plate is hinged to a power output shaft of the floating device cylinder (2-2);
   the fixed electro-conduction seat (2-4) is located between two support rods and the other end of the two support rods is hinged to two outer sidewalls of the fixed electro-conduction seat (2-4) respectively; thus, when the power output shaft of the floating device cylinder (2-2) pushes the floating device connection rod (2-3), the floating device connection rod (2-3) lifts the fixed electro-conduction seat (2-4); and
   a groove is disposed on the fixed electro-conduction seat (2-4) and multiple pairs of electro-conduction floating blocks (2-6) are symmetrically inserted into the groove of the fixed electro-conduction seat (2-4); all the electro-conduction floating blocks (2-6) are fixedly and electrically connected to the fixed electro-conduction seat (2-4) via the electro-conduction wire (2-5); a spring (2-7) is fixed between the bottom of each electro-conduction floating block (2-6) and the groove of the fixed electro-conduction seat (2-4).

3. The lateral electro-conduction device of claim 2, wherein the floating surface contact electro-conduction device (2) further comprises a steel pipe detection device;
   the steel pipe detection device (7) is used to send a floating device start signal when detecting that a steel pipe is present on the support device (1); and
   the floating device cylinder (2-2) is used to, after receiving the floating device start signal, extend the power output shaft to push the floating device connection rod (2-3).

4. The lateral electro-conduction device of claim 1, wherein the floating surface contact electro-conduction device (2) further comprises at least one negative-pole welding wire harness connection plate (2-8);
   the at least one negative-pole welding wire harness connection plate (2-8) is fixed on a sidewall of a fixed electro-connection seat (2-4);
   the at least one negative-pole welding wire harness connection plate (2-8) is electrically connected with electro-connection floating blocks (2-6) by the fixed electro-conduction seat (2-4); and
   the lateral electro-conduction brush device (3) is electrically connected to the at least one negative-pole welding wire harness connection plate (2-8) by a wire.

5. The lateral electro-conduction device of claim 4, wherein the lateral electro-conduction brush device (3) further comprises an electric brush seat (3-2), an electric brush electro-conduction plate (3-3), an electric brush cylinder (3-4) and a slide guide rail (3-5);
   the electric brush seat (3-2) is fixed at a side surface of the support device (1);
   the electric brush electro-conduction plate (3-3) is slidably connected with the electric brush seat (3-2) by the slide guide rail (3-5);
   a cylinder body of the electric brush cylinder (3-4) is fixed on the electric brush seat (3-2), and a power output shaft of the electric brush cylinder (3-4) is fixed to the electric brush electro-conduction plate (3-3) to push the electric brush electro-conduction plate (3-3) to slide relative to the electric brush seat (3-2); and
   the electro-conduction brushes (3-1) are fixed on an outer sidewall of the electric brush electro-conduction plate (3-3); the electro-conduction brushes (3-1) are electrically connected to the at least one negative-pole welding wire harness connection plate (2-8) by the electric brush electro-conduction plate (3-3) and a wire.

6. The lateral electro-conduction device of claim 2, wherein the floating surface contact electro-conduction device (2) further comprises at least one negative-pole welding wire harness connection plate (2-8);
   the at least one negative-pole welding wire harness connection plate (2-8) is fixed on a sidewall of a fixed electro-connection seat (2-4);

the at least one negative-pole welding wire harness connection plate (2-8) is electrically connected with the electro-connection floating blocks (2-6) by the fixed electro-conduction seat (2-4); and the lateral electro-conduction brush device (3) is electrically connected to the at least one negative-pole welding wire harness connection plate (2-8) by a wire.

7. The lateral electro-conduction device of claim 3, wherein the floating surface contact electro-conduction device (2) further comprises at least one negative-pole welding wire harness connection plate (2-8);

the at least one negative-pole welding wire harness connection plate (2-8) is fixed on a sidewall of a fixed electro-connection seat (2-4);

the at least one negative-pole welding wire harness connection plate (2-8) is electrically connected with the electro-connection floating blocks (2-6) by the fixed electro-conduction seat (2-4); and the lateral electro-conduction brush device (3) is electrically connected to the at least one negative-pole welding wire harness connection plate (2-8) by a wire.

* * * * *